United States Patent
Neal et al.

(10) Patent No.: US 12,337,779 B2
(45) Date of Patent: Jun. 24, 2025

(54) RESPONDER ASSISTANCE FOR VEHICULAR EVENTS

(71) Applicant: FORD GLOBAL TECHNOLOGIES, LLC, Dearborn, MI (US)

(72) Inventors: Joseph Walter Neal, Birmingham, MI (US); Jeremy Lerner, Southfield, MI (US); Mohammad Abouali, Canton, MI (US); Ali Abdallah, Dearborn, MI (US); Xingping Chen, Troy, MI (US); Scott Huggins, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/860,195

(22) Filed: Jul. 8, 2022

(65) Prior Publication Data

US 2024/0010152 A1 Jan. 11, 2024

(51) Int. Cl.
*B60R 21/015* (2006.01)
*B60R 21/00* (2006.01)
(Continued)

(52) U.S. Cl.
CPC ...... *B60R 21/01542* (2014.10); *B60R 21/013* (2013.01); *H04W 4/40* (2018.02);
(Continued)

(58) Field of Classification Search
CPC .... B60R 2021/01315; B60R 21/01542; B60R 21/0154; B60R 2021/0032;
(Continued)

(56) References Cited

U.S. PATENT DOCUMENTS

| 6,868,340 | B2 * | 3/2005 | Alexander | A62B 99/00 |
| | | | | 711/100 |
| 7,983,817 | B2 * | 7/2011 | Breed | B60N 2/2863 |
| | | | | 367/137 |

(Continued)

FOREIGN PATENT DOCUMENTS

CN 114205777 A * 3/2022 ............ B60W 30/08

OTHER PUBLICATIONS

CN114205777A English translation provided Mar. 7, 2024 (Year: 2022).*

*Primary Examiner* — Paul N Dickson
*Assistant Examiner* — Caitlin Anne Miller
(74) *Attorney, Agent, or Firm* — Joseph Zane; Brooks Kushman P.C.

(57) ABSTRACT

A vehicle includes one or more sensors and engages at least one of the one or more sensors to evaluate at least one of a count or location of vehicle occupants prior to an incident. The vehicle determines that an incident has occurred and that at least one of an evaluated count or location of at least one vehicle occupant has changed following the incident. Also, the vehicle engages at least one of the one or more sensors to detect a presence of a prior occupant outside the vehicle following the incident, responsive to determining that the at least one of the evaluated count or location of the at least one vehicle occupant changed and, responsive to detecting the presence of the prior occupant outside the vehicle following the incident, reports the presence to a $3^{rd}$ party response entity.

5 Claims, 4 Drawing Sheets

(51) Int. Cl.
*B60R 21/01* (2006.01)
*B60R 21/013* (2006.01)
*H04W 4/40* (2018.01)
*H04W 4/90* (2018.01)

(52) U.S. Cl.
CPC ....... *H04W 4/90* (2018.02); *B60R 2021/0027* (2013.01); *B60R 2021/0032* (2013.01); *B60R 2021/006* (2013.01); *B60R 2021/0102* (2013.01); *B60R 2021/01088* (2013.01); *B60R 2021/01315* (2013.01)

(58) Field of Classification Search
CPC .... B60R 2021/006; B60R 2021/01088; B60N 2/002; B60N 2/0276; H04W 4/90; H04W 4/40
See application file for complete search history.

(56) References Cited

U.S. PATENT DOCUMENTS

| | | | |
|---|---|---|---|
| 9,442,017 B2* | 9/2016 | Read | G01J 5/028 |
| 9,524,597 B2* | 12/2016 | Ricci | H04W 76/11 |
| 9,969,344 B1 | 5/2018 | Kolasinski | |
| 9,998,892 B2* | 6/2018 | Tzirkel-Hancock | H04W 4/90 |
| 10,632,945 B2* | 4/2020 | Lin | B60R 16/037 |
| 10,807,593 B1 | 10/2020 | Nave et al. | |
| 10,906,494 B1* | 2/2021 | Chan | B60R 21/01552 |
| 11,089,467 B2* | 8/2021 | Affeldt | H04W 8/005 |
| 11,345,353 B2* | 5/2022 | Luo | B60R 21/01 |
| 2014/0241581 A1* | 8/2014 | Narayanan | G06T 7/73 382/103 |
| 2019/0329729 A1* | 10/2019 | Hilligardt | B60R 21/34 |
| 2020/0334928 A1 | 10/2020 | Bourke et al. | |
| 2021/0107404 A1* | 4/2021 | Wildemann | G06V 20/56 |
| 2022/0066043 A1* | 3/2022 | Nagasawa | H04W 4/44 |
| 2022/0068137 A1* | 3/2022 | Nagasawa | G08G 1/162 |

* cited by examiner

RESPONDER ASSISTANCE FOR VEHICULAR EVENTS

TECHNICAL FIELD

The illustrative embodiments, and the like, generally relate to responder assistance for vehicular events.

BACKGROUND

When a vehicle is involved in an incident, many things can happen to vehicle occupants. Typically, it is not possible to know what has occurred in the absence of detailed communication from an occupant and/or arrival of a responder on-scene. Since the outcomes of incidents are so varied, it is a common practice to send a certain amount of equipment to a scene, which includes anything commonly expected to be needed, so that the responder is not lacking upon arrival.

Cities providing responders have limited resources, however, and the above practice may require waiting for a responder with adequate equipment. Moreover, if the incident occurred under abnormal or remote conditions, or an atypical outcome occurred, the responder may lack preferred resources in the set of tools commonly brought to incidents.

When an occupant calls a public access point (PSAP), the occupant can often provide a more detailed account of what occurred, allowing for better utilization of resources and dispatch of the appropriate resources to address the incident. When such a phone call cannot be made, or is not made, however, the responders are forced to call for additional resources if the base resources commonly deployed prove inadequate.

SUMMARY

In a first illustrative embodiment, a vehicle includes one or more sensors and one or more processors configured to engage at least one of the one or more sensors to evaluate at least one of a count or location of vehicle occupants prior to an incident. The one or more processors are further configured to determine that an incident has occurred and that at least one of an evaluated count or location of at least one vehicle occupant has changed following the incident. Also, the one or more sensors are configured to engage at least one of the one or more sensors to detect a presence of a prior occupant outside the vehicle following the incident, responsive to determining that the at least one of the evaluated count or location of the at least one vehicle occupant changed and, responsive to detecting the presence of the prior occupant outside the vehicle following the incident, report the presence to a $3^{rd}$ party response entity.

In a second illustrative embodiment, a system includes one or more processors configured to receive incident report data including indication of a vehicle incident, vehicle location and locations of vehicle occupants, at least one of which occupant locations is outside of the vehicle location. The one or more processors are also configured to access map data to determine types of map data to be provided to a responder, based at least in part on a complexity of terrain indicated by the map data. Further, the one or more sensors are configured to create a visual indication of a scene of the incident, including map data based on the determined types of map data and locations of the vehicle and any occupant locations outside of the vehicle location and send the visual indication to a responder entity associated with response to the incident.

In a third illustrative embodiment, a method includes detecting a vehicle incident and determining, based on vehicle sensor data, that at least one of a headcount of occupants or a location of at least one occupant has changed following the incident, the headcount and locations determined prior to the incident based on prior vehicle sensor data. The method also includes engaging at least one sensor capable of sensing outside of a vehicle interior, responsive to the at least one of the headcount or the location of the at least one occupant having changed and receiving sensor data from the engaged at least one sensor indicative of a predicted location of at least one vehicle occupant having left the vehicle as a result of the incident. Further, the method includes determining at least an approximate location relative to the vehicle of the at least one vehicle occupant having left the vehicle, based at least on the sensor data from the engaged at least one sensor and reporting the incident to a remote server, including at least the approximate location.

DETAILED DESCRIPTION

Figure 1:
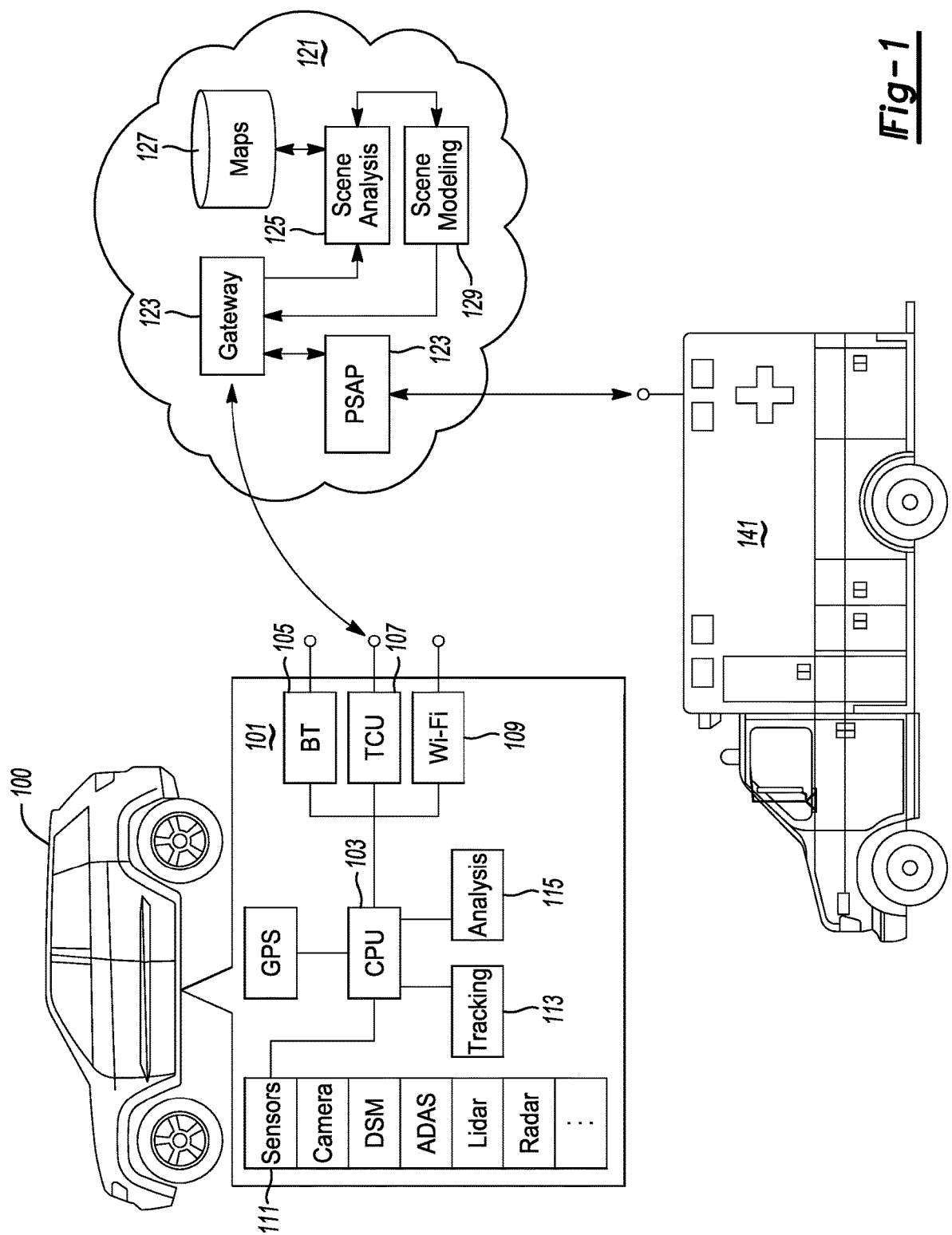
FIG. 1 shows an illustrative example of a vehicle computing system and cloud-based assistance system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Modern vehicles include many more sensors than previous vehicles included, which can take the form of, for example, without limitation, cameras, weight sensors, motion sensors, LIDAR, RADAR, driver state monitoring systems, etc. While these sensors often have a set of assigned functions unrelated to incident reporting, many of these sensors may be able to assist, or situationally assist, in incident evaluation and aid in presenting information about the incident that can be used by responders to timely dispatch appropriate resources.

For example, it may be possible to use onboard interior cameras and sensors to determine the composition of and locations of vehicle occupants, through, for example, facial recognition, person recognition (e.g., where faces are not know but distinct face existence can be gleaned for headcount), occupancy sensing (e.g., weight sensing), device sensing (under an assumption that a device corresponds to at least one person), etc. These and similar systems can be used to determine, to a greater or lesser extent, the composition of and location of vehicle occupants. While the system may not always achieve perfect composition, it may be able to discern certain aspects of occupancy that can be cross-checked upon incident to determine, for example, if there are fewer occupants than expected, within the vehicle, post-incident.

Similarly, exterior sensors may be usable to determine if there are unexpected parties outside of a vehicle post-incident. For example, without limitation, following an incident, LIDAR and cameras (IR and conventional) may be used to determine if there are objects outside the vehicle that correspond to people or that likely correspond to people. While this is not necessarily dispositive of a person who should be in the vehicle, being outside the vehicle, merging of various data sets can reveal when that is the case through at least a likelihood analysis—i.e., if there were four people expected inside the vehicle, and there was an incident, and only three people are still detected inside the vehicle, and an exterior sensor detects one person outside the vehicle, there is at least a statistical likelihood that the person outside the vehicle is the person missing from the headcount inside the vehicle. Such information may be useful to a responder based on a prediction about how it was that the exterior person left the vehicle.

Other sensors may be capable of device detection, and can detect devices outside the vehicle, that were expected to be inside the vehicle, following an incident. While the device, and not a corresponding person, may have left the vehicle due to the incident, if there is also a person missing from the headcount inside the vehicle, it may be a reasonable assumption that the device corresponds to the person, and that the person is in the vicinity of the device, even if the exterior sensors do not detect the person or the vehicle lacks sufficient sensing capability to detect the person. Further, device detection techniques may be usable to determine a directionality and/or approximate distance to the detected device, so that a responder, arriving in the dark, for example, may be able to use the projected device location as a reasonable location to look for a corresponding person.

While it may not be possible to provide a perfect depiction of a scene using vehicle sensors and the like, it may be possible to provide better data and projections over what is current available. Headcounts, changes in occupant location, vehicles involved, persons outside vehicles, etc. may assist dispatch in sending the appropriate amounts of resources and any specialized resources needed. Similarly, if the incident seems to call for fewer resources than are conventionally dispatched, that decision can be made by the PSAP as well, which may allow a faster response time if certain dispatch vehicles are not being used for other purposes and can respond more swiftly.

FIG. 1 shows an illustrative example of a vehicle computing system and cloud-based assistance system. In this example vehicle 100 includes an onboard computing system 101, which may include, for example, a variety of onboard electronic control units and other software, hardware and firmware devices. Different vehicles 100 may have different capabilities, so the sensing and detection capabilities may vary from model year and over different models, but the general principles discussed herein can be used to some level of success with at least minimal sensing capability. Predictions will likely be less accurate based on diminished sensing, but it may be the case that some predictive capability is preferable to no predictive capability.

In this example, the vehicle 100 includes one or more onboard processors or controllers 103, as well as a BLUETOOTH transceiver 105, a telematics control unit (TCU) 107 and a Wi-Fi transceiver 109. The BLUETOOTH or other short-range communication technology and the Wi-Fi units may be used to communicate with local devices onboard the vehicle 100. These devices are often usable as proxies for occupants, assuming that each device represents at least one occupant, but that devices may also overlap (i.e., a single occupant may have multiple devices). As such, they are not always the sole basis for counting occupancy, but it may be reasonable to assume that at least one device in a vehicle corresponds to at least one occupant, and that, for example, at least one device in a rear area commonly corresponds to at least one person in the rear area.

For better correlation, weight sensors and other sensors can be cross referenced with device sensing, for both determining occupancy totals and for temporarily assigning devices to occupants. For example, if a device is in the rear area and a rear weight sensors is engaged, it may be assumed that the device corresponds to someone in that location. Then, following an incident, if the device is detected outside the vehicle and, for example, the rear weight sensor does not indicate occupancy, it may be reasonable to predict that the person left the vehicle along with the device.

TCU may be used for cellular long-range communication, and may use a vehicle modem to communicate with a remote server 121. Wi-Fi and other communication formats usable for longer range communication over a network may also be used, but presently the TCU may provide the most consistent long range communication, although this may change as more Wide-Area-Network connected Wi-Fi transceivers are deployed as part of infrastructure.

The vehicle may include, for example, cameras (conventional and IR), driver state monitoring, adaptive driver assistance sensors, LIDAR, RADAR, etc. Any or all of these may provide different levels of sensing assistance in various aspects of the illustrative embodiments, as appropriate. Sensors may also be interior or exterior in facing and nature, and may further have additional secondary or primary functionality outside the scope of the illustrative embodiments (i.e., the sensors perform other functions related to other vehicle services and can be temporarily repurposed for use in the illustrative embodiments).

The vehicle 100 may also include tracking and analysis software 113, 115. The tracking software 113 may include, for example, identification of occupants and determination of occupant locations, and may represent one or more algorithms working alone or in conjunction to best determine the composition of and location of occupants based on available sensing and other factors. The analysis software 115 may be reactive to an incident and may include determining changes to occupant locations and composition, and may serve to marshal data and instruct sensor engagement to further obtain data that is of interest to scene analysis. The analysis software may play a role in scene assembly, and the cloud 121 may further provide additional supporting data for scene assembly. For example, if an end-result is a gathering of topological and map data over which occupant location predictions are laid, this may occur at either location and/or on a mobile device connected by BLUETOOTH, depending on where the sufficient computing power lies and where sufficient data is held. To the extent that a data source is deficient, the missing data (e.g., topographical map data) may be provided by another of these entities or a comparable entity.

In the cloud 121, a gateway process 123 can handle various incoming telematics requests issued to the cloud 121 for a variety of reasons. When a request for scene construction occurs, such as may be issued by a vehicle 100 in response to an incident, the gateway may route the request and accompanying data to a scene analysis process 125. That process, for example, may utilized onboard sensor data sent to the cloud and combine that data with map (e.g., topographical and geographical) data 127 to provide a scene modeling process 129 with sufficient resources to model a scene.

The analysis process 125 may determine the correct locations of the indicators (e.g., locations of persons or devices) received from the vehicle 100 sensors and the modeling process 129 may create a visual representation of the predicted scene, if that may be of use to a responder. Additionally and alternatively, the relevant information can be provided in a text or verbal output format. This information may be sent to a PSAP relay process 131, which is aware of any open communications with a PSAP related to the incident and can supplement any vehicle data transmitted to the PSAP with the scene modeling. Additionally or alternatively, the modeling and analysis process may reside with a PSAP server and the vehicle 100 may transmit the supplemental data directly to the PSAP, where it can be analyzed and modeled. Ultimately, the enhanced scene data, in an appropriate format, is delivered to one or more responders or dispatches who can instruct response using resources appropriate to the predicted situation.

Figure 2:
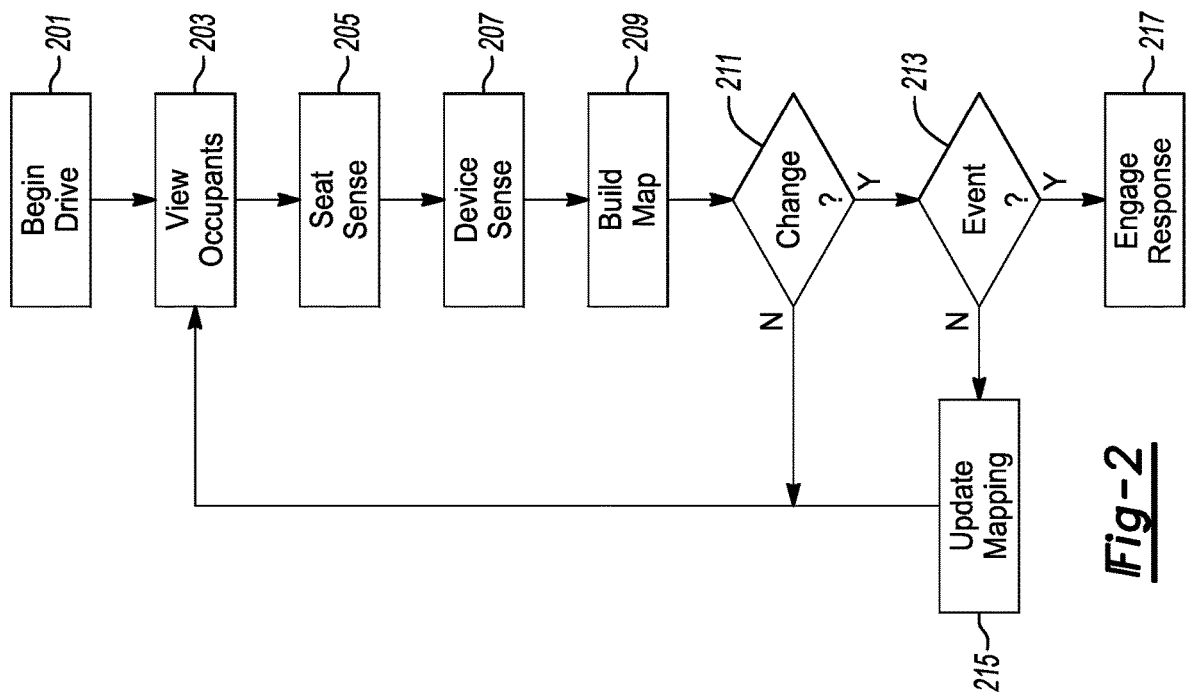
FIG. 2 shows an illustrative occupant evaluation process.

FIG. 2 shows an illustrative occupant evaluation process. This example shows illustrative sensor usage to evaluate vehicle occupants and their locations. Other comparable and/or reasonable sensors could be used to a similar end, and are not outside the scope of contemplation. In this example, the process engages when a vehicle begins moving at 201, although it could start at any reasonable point (once doors were closed, once securing mechanisms were buckled, etc.). The process uses an interior camera to view occupants at 203. This can include the use of multiple cameras, and each camera may be cognizant of one or more zones. This process can used advanced facial recognition to specifically correlate occupants to known parties based on prior specific identification of individuals, or can use a less advanced form of recognition that simply distinguishes people from each other, for example, or does intermediary correlation such as attempting to distinguish between, for example, children and adults.

One or more weight sensors is also utilized at 205. While weight is not a proxy for age, the vehicle may attempt to use this data to determine the approximate size of occupants and/or which areas have occupants therein. Further, in this example, device sensing is used at 207. Device sensing can include, for example, general interior device sensing, i.e., sensing devices within an interior and/or short range of a vehicle if the sensors cannot distinguish between interior and exterior nearby devices. If the sensors may also have logged one or more exterior devices, a second sensing round when the vehicle has moved any reasonable distance should reveal which devices of those previously sensed are still traveling with the vehicle 100. Device sensing can also include distance ranging and triangulation, as well as very near sensing (e.g., NFC) to determine approximate device locations within a vehicle.

The vehicle 100 may fuse this sensor data to build an approximation of where people are located within a vehicle 100. For example, if the cameras are determined to have full view of the cabin and count four heads after multiple rounds of sensing, it is reasonable to assume that there is a high likelihood of four occupants. Weight sensing coupled with imagery for verification may reveal where those occupants are likely sitting. Device sensing and/or device locating may allow correlation of devices to occupants, although this is a lower likely persistent prediction because devices can be handed about while the vehicle is moving, more frequently than people will change locations. Accordingly, predictions about occupancy and locations can be used to build an approximate map of the vehicle interior at 209.

If there is any change in the noted predicted configuration at 211, such as a change to weight sensing or a viewed movement of locations on camera, for example, the process may determine if an event has also occurred at 213. In other instances, the event occurrence itself will be triggered prior to the determined change (e.g., engagement of one or more vehicle sensors indicating an event, or a sudden change in vehicle movement profile). If there was not an event at 213, the process may determine that a person simply changed areas, or, for example, exited or entered a vehicle at a stop, and may update the mapping accordingly at 215. If there was an event at 213, the process may engage an event response routine at 217.

Figure 3:
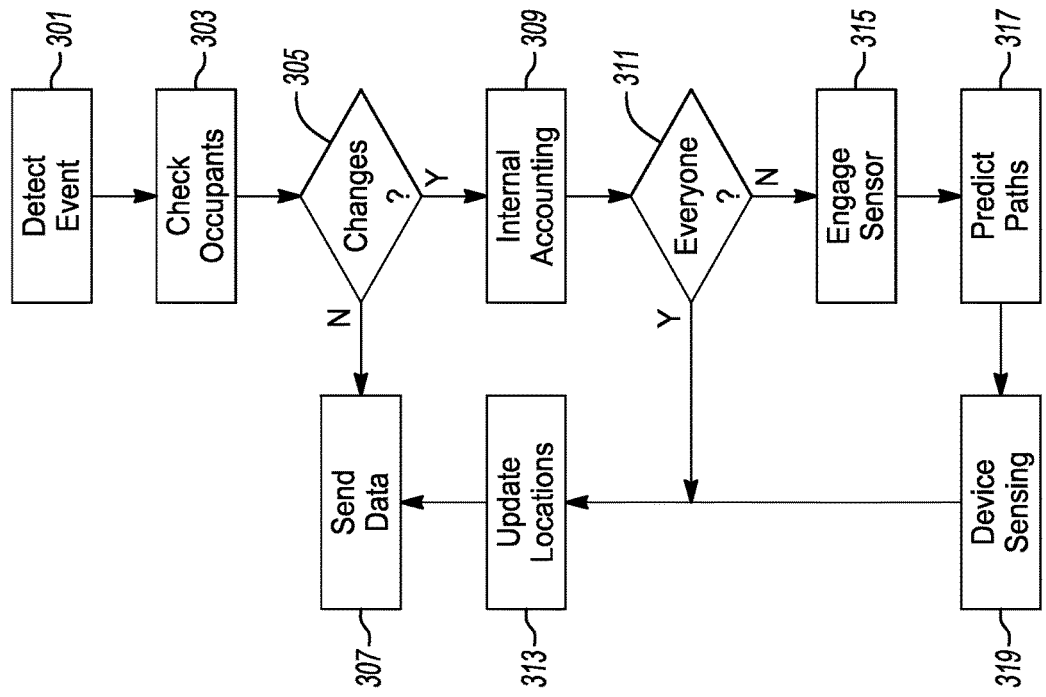
FIG. 3 shows a first illustrative event evaluation process.

FIG. 3 shows a first illustrative event evaluation process. In this example, the process determines that an event has occurred at 301 and checks the predicted occupancy and locations at 303, based on, for example, a process that previously indicated expected occupant and locations, such as that discussed with respect to FIG. 2. If the event did occur, but there was no noted change in occupancy or locations at 303, the process may send event-related data for use at the cloud or PSAP at 307. This data can include, for example, GPS data, interior imagery, speeds prior to event, yaw, pitch, roll, physics data, occupancy, locations of parties, etc.

If there is a change to occupancy or location at 305, such as, but not limited to, fewer than expected occupants and/or parties out of location based on projected location, the process may attempt to remap the interior. For example, it may be quickly determined that a weight sensor has no weight on it, and if an occupant has moved to a non-sensing location, the lack of sensing for that person may initially indicate they are no longer present within the vehicle 100. But an internal camera view may reveal the appropriate number of parties based on recognition at 309, or at least a high likelihood that everyone is still present.

Even if everyone is still present at 311, new location information may be provided and projected at 313, indicating the predicted locations of the occupants based on available sensing. This could include an occupant being in an uncommon location within the vehicle, for example. Again, this data can be sent to the server and/or PSAP at 307 along with other appropriate data.

If everyone is not present at 311, that is, if the interior sensors cannot produce results indicative of the full expected occupancy, there is a chance at least one occupant left the vehicle during the incident. In order to better assess the likelihood of this occurrence, the process may engage exterior sensors at 315, which may be used to sense the location or likely location of people who may no longer be within the vehicle.

In this example, the sensors may predict locations and paths of these people at 317, based on detection of parties outside the vehicle (e.g., IR sensing or LIDAR sensing), as well as modifications to surrounding terrain and foliage that appear abnormal and may be indicative of a party entering such an area at a high rate of speed. Movement sensing and heat sensing may aid in discovering parties partially or fully concealed by the surroundings.

The process may also use device sensing at 319. Since a device is often unsecured, it may be more likely for a device, than its possessor, to leave the vehicle during an incident. Nonetheless, if fewer than an expected number of occupants are present in the vehicle 100 following the incident, device sensing may be a useful way to approximate the location of a device possessor, since it can include both directionality and distance estimations, and because it can occur through various impediments and is less subject to visual interference rendering it non-functional. For example, if a device possessor is in a defile or another situation where visual sensing could not detect them, radio frequency device sensing may still give an estimate or reasonably accurate prediction of their location relative to the vehicle 100. Again, once locations (in this instance including projected locations externally, at least relative to the vehicle 100 based on types of sensors, sensor locations and estimated relative position to the vehicle) have been determined, the projected locations may be updated at 313 and communicated to the remote source.

Further, device communication can be used to obtain coordinates for a device and/or to remotely engage a device camera, so that it is theoretically possible for a device to provide a vehicle with its GPS coordinates and one or more images or videos of what the device is seeing. If the device is still within a pocket, then the images may not be useful, other than to reveal that the device is at the same location as the pocket. If the device is nearby a person, however, the images may show images of the person and/or nearby features usable to quickly narrow down a device, and thus a person's, location. Even if the cloud and/or PSAP software cannot analyze the images sufficiently, provision of such images to the responders may assist in locating the person.

Figure 4:
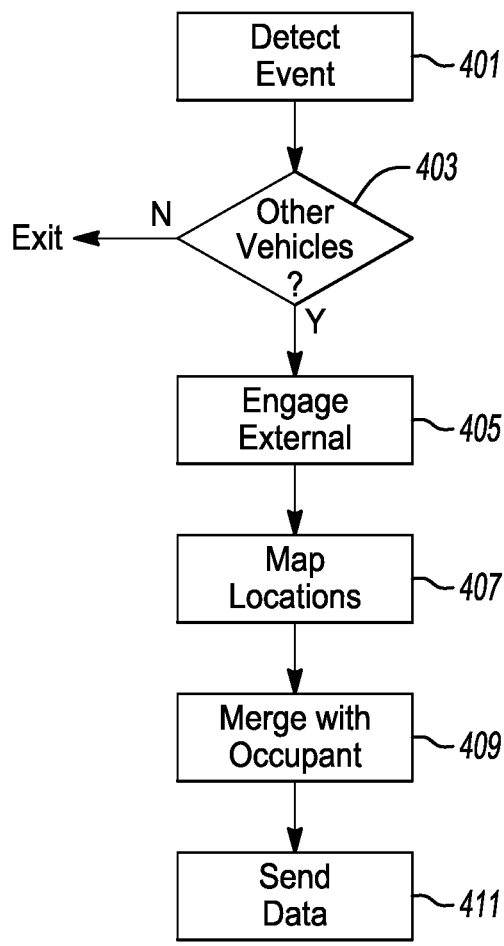
FIG. 4 shows a second illustrative event evaluation process.

FIG. 4 shows a second illustrative event evaluation process. This process can occur in concert with the process in FIG. 3, and is also responsive to incident or event detection at 401. In this example, the process relates to determinations made on behalf of other vehicles at 403, so if no other vehicles are detected or deemed involved in the incident at 403, the process may exit.

On the other hand, if another vehicle is likely to have been involved, the process may engage external sensing and, similar to above, may map predicted locations of parties outside the vehicle 100 at 407. Since the process does not know the occupancy, locations, device IDs, etc. of occupants of another vehicle, and because there may be bystanders, this may be a less effective mapping than doing external mapping for an ego vehicle including the sensors, but the information may still assist responders in appropriate response.

Further, in this example, the process may merge the data with occupant data of the ego vehicle at 409, to prevent double recognition of a person. That is, if the data for the ego vehicle indicated a person at one location, and the sensing process for external $3^{rd}$ party involvement also indicated a person at the same or a very similar location, the merge may consider this data to be reflective of the single party, and not two people. On the other hand, data from the ego vehicle may indicate that everyone is still in the vehicle 100, but the external sensing may reveal one person external to the ego vehicle who may require assistance, and that person will persist through the data merge. All relevant data may then be sent to the PSAP and/or the cloud.

Figure 5:
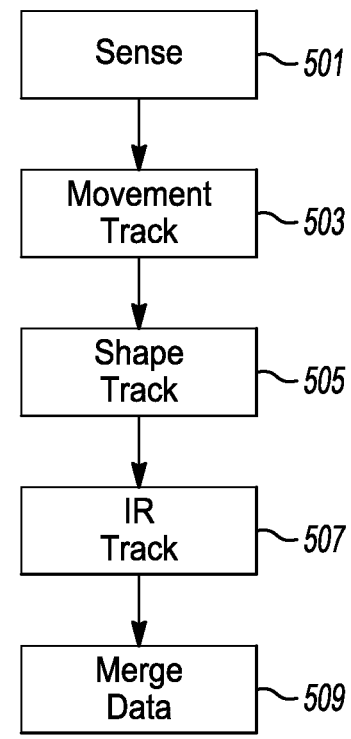
FIG. 5 shows an illustrative sensing process.

FIG. 5 shows an illustrative sensing process. Without limitation, this is a brief discussion of types of sensing that may reveal parties outside of the vehicle 100. This can include movement tracking at 503, such as that detectable through motion sensors, RADAR, LIDAR, etc. Some motion tracking may be more accurate than others, but many vehicles come with motion sensors that are reasonable sensitive to even slight movement to prevent pedestrian encounters, and if the party is within a sensing field of such a sensor, this can be a good indicator of an external presence. Further, such sensors often have a directionality, so that at least a guess at a party location could be obtained based on sensed location. LIDAR may be highly accurate at predicting changes indicative of movement, but may be more limited in range.

Shape tracking at 505, such as image processing and point-cloud comparison can be useful for determining objects in view of sensors that have threshold resemblances to people. This can be useful if a person exterior to the vehicle is lying still, which may render motion sensing less useful. Recognizing the likely shape of a prone person can provide at least an indication to a responder that the person may be in the sensed location.

IR tracking or other heat sensing at 507 may be useful for identifying the presence of people exterior to a vehicle. Depending on exterior and environmental temperatures, this information may be more or less useful, but this technology may also reveal the presence of parties that are obscured enough that shape tracking cannot sufficiently identify them as being a person. When all of data is merged at 509, the combination of data can increase the likelihood of correct identification and the various sets of data can help address potential deficiencies in the other types of data, if the full suite of sensing capability is available and technologically capable enough to be useful.

Figure 6:
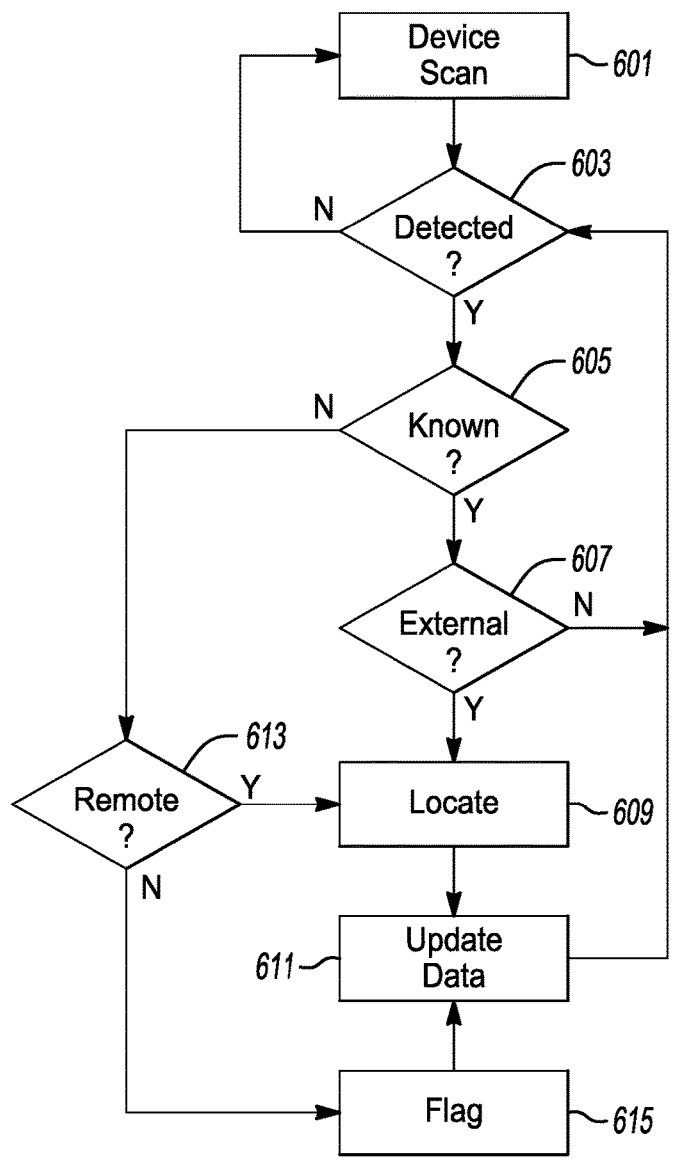
FIG. 6 shows an illustrative device detection process.

FIG. 6 shows an illustrative device detection process. In this example, the process also scans for devices at 601. This can be a search for known (device ID previously known) and unknown devices. If a device is detected at 603, the process can determine at 605 if the device is known or unknown. If the device is external to the vehicle at 607, the process may attempt to locate the known device at 609. Devices internal to the vehicle 100 may also be located, but this example is focused on external device detection and location, although similar concepts can apply inside a vehicle.

Based on a location of a device determined, for example, using directional antennas, directional sweeps, triangulation, etc., the process may update location data indicating a device location at 611. Other ranging data, such as received signal strength indicator (RSSI) or other techniques may be used to determine a distance to the device.

If the device is unknown at 605, such as devices not previously detected at the vehicle 100, the process may determine at 613 if the vehicle location is a remote location. That is, within an occupied area, such as a city, there may be hundreds of proximate devices to a vehicle incident, and correlation of a given unknown device to the incident itself may be near impossible. If the location is relatively remote, however, or if only a few unknown devices are detected (as another example of sorting), it may be reasonable to assume that those devices could have been involved in the incident. If any sorts resulting in a reasonable likelihood the device was involved are positive at 613, the location of the unknown device can be determined through techniques such as those above. Otherwise, all devices may be flagged at 615 and reported, but that data may be discarded as being too cluttered to be useful.

Figure 7:
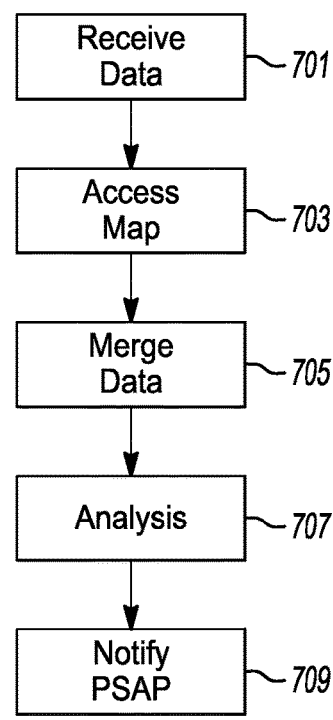
FIG. 7 shows an illustrative scene estimation process.

FIG. 7 shows an illustrative scene estimation process. In this example, an analysis process with access to map data (geographic, topological, etc.) may receive the data at 701 for analysis. The process can access appropriate maps at 703 and overlay the data. If a topographical map reveals limited cover and flat profiles, it is possible that only geographical maps are used. If the map reveals topology changes and/or forest or other cover, multiple map sets may be used or merged at 705.

The merger at 705 may also include location overlays of the data received from the vehicle, such as person location, device location, recommended search areas, percentage estimates of location, etc. Color coding may be used to indicate higher probability locations or zones, so the responders can know where to look first and/or what sorts of equipment may be necessary to assist everyone.

An analysis process at 707 may also evaluate the types of terrain and locations, as well as trajectories from and distances from a vehicle, as further indication to the responders about the possible condition of occupants who are no longer in the vehicle 100. Responders can draw their own conclusions about the equipment, but may benefit from knowing that a person is 10 feet from a vehicle 100 following an incident. The relevant data and analysis can then be sent to a PSAP in graphical, audio and/or text format, as requested and appropriate, and assuming the PSAP did not perform the initial analysis of the received data.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
receive incident report data including indication of a vehicle incident, vehicle location and locations of vehicle occupants, at least one of which occupant locations is outside of the vehicle location;
access map data to determine types of map data to be provided to a responder, based at least in part on a complexity of terrain indicated by the map data;
create a visual indication of a scene of the incident, including map data based on the determined types of map data and locations of the vehicle and any occupant locations outside of the vehicle location; and
send the visual indication to a responder entity associated with response to the incident.

2. The system of claim 1, wherein the complexity of terrain includes consideration of varied topography indicative of changes in elevation within a predefined proximity to the vehicle.

3. The system of claim 1, wherein the complexity of terrain includes the presence of plant growth as indicated by the map data.

4. The system of claim 1, wherein the map data includes at least topographical map data indicating elevations and geographical map data indicating the presence of roadways.

5. The system of claim 1, wherein at least one occupant location is a location relative to the vehicle location, including at least an estimated distance and heading, and wherein the one or more processors are configured to convert the location relative to the vehicle location to a location on the map data included in the visual indication.

\* \* \* \* \*